US008352667B2

(12) United States Patent
Suzuki et al.

(10) Patent No.: US 8,352,667 B2
(45) Date of Patent: Jan. 8, 2013

(54) I/O CONNECTION SYSTEM AND I/O CONNECTION METHOD

(75) Inventors: Jun Suzuki, Tokyo (JP); Youichi Hidaka, Tokyo (JP); Takashi Yoshikawa, Tokyo (JP)

(73) Assignee: NEC Corporation, Tokyo (JP)

(*) Notice: Subject to any disclaimer, the term of this patent is extended or adjusted under 35 U.S.C. 154(b) by 451 days.

(21) Appl. No.: 12/739,843

(22) PCT Filed: Oct. 27, 2008

(86) PCT No.: PCT/JP2008/069443
§ 371 (c)(1),
(2), (4) Date: Apr. 26, 2010

(87) PCT Pub. No.: WO2009/054525

PCT Pub. Date: Apr. 30, 2009

(65) Prior Publication Data
US 2010/0257302 A1    Oct. 7, 2010

(30) Foreign Application Priority Data
Oct. 26, 2007    (JP) .................................. 2007-278395

(51) Int. Cl.
*G06F 13/36*    (2006.01)
(52) U.S. Cl. .......................... 710/314; 710/305; 370/469
(58) Field of Classification Search .......... 710/305–314; 370/469
See application file for complete search history.

(56) References Cited

U.S. PATENT DOCUMENTS

2005/0060470 A1*  3/2005  Main et al. ..................... 710/305
2006/0206655 A1*  9/2006  Chappell et al. ............... 710/315
2006/0253619 A1   11/2006  Torudbakken

OTHER PUBLICATIONS

International Search Report for PCT/JP2008/069443, mailed Jan. 20, 2009.
PCI-SIG, Multi-Root I/O Virtualization and Sharing Revision 0.7, Jun. 8, 2007, p. 28.
J. Suzuki et al., "Express Ether—Ethernet-Based Virtualization Technology for Reconfigurable Hardware Platform", Proceedings of the 14th IEEE Symposium on High-Performance Interconnects, Aug. 23, 2006, pp. 45-51.
Y. Ohara et al., "IDF Fall 2006—PCI Express Update, I/O Virtualization", Maikomi Journal, Mainichi Communications, Inc., Oct. 18, 2006.
J. Okitsu et al., "Performance Evaluation of a Switch-Connected Remote I/O System", IEICE Technical Report, CPSY Computer Systems, Dec. 8, 2006, vol. 106, No. 436, pp. 43-48.
R. Recio, "Server I/O Networks Past, Present and Future", Proceedings of the ACM SIGCOMM 2003 Workshops, Aug. 25, 2003, pp. 163-178.
NEC Corp., "Develop Next-Generation Interfaces Which Integrate PCI-Express and Ethernet to Improve Extensibility/Reliability of Service Platforms and Facilitate Operation Control", Press Release—NEC Corporation, Dec. 6, 2006.

* cited by examiner

*Primary Examiner* — Clifford Knoll (57) ABSTRACT

Upstream network interfaces (2-1-2-N) and downstream network interfaces (5-1-5-M) have an upstream PCI-PCI bridge function and a downstream PCI-PCI bridge function, respectively. These network interfaces (2-1-2-N, 5-1-5-M) and a network (3) are incorporated in a system as a single multi-root PCI express switch. The network (3) tunnels TLPs (Transaction Layer Packets) between the upstream network interfaces (2-1-2-N) and the downstream network interfaces (5-1-5-M) or between the downstream network interfaces (5-1-5-M). This enables to distribute and connect a plurality of computers and a plurality of I/Os on a large scale without changing software, root complexes, and I/Os.

19 Claims, 10 Drawing Sheets

FIG. 1

ENCAPSULATION TABLE 204

| | LOWER LIMIT OF BUS NUMBER | UPPER LIMIT OF BUS NUMBER | LOWER LIMIT OF MEMORY | UPPER LIMIT OF MEMORY | NETWORK ADDRESS |
|---|---|---|---|---|---|
| ENTRY 1 | 2041-1 | 2042-1 | 2043-1 | 2044-1 | 2045-1 |
| ENTRY 2 | 2041-2 | 2042-2 | 2043-2 | 2044-2 | 2045-2 |
| ⋮ | ⋮ | ⋮ | ⋮ | ⋮ | ⋮ |
| ENTRY M | 2041-M | 2042-M | 2043-M | 2044-M | 2045-M |

FIG. 2

ENCAPSULATION TABLE 503

| | LOWER LIMIT OF BUS NUMBER | UPPER LIMIT OF BUS NUMBER | LOWER LIMIT OF MEMORY | UPPER LIMIT OF MEMORY | NETWORK ADDRESS |
|---|---|---|---|---|---|
| ENTRY 1 | 5031-1-1 | 5032-1-1 | 5033-1-1 | 5034-1-1 | 5035-1-1 |
| ENTRY 2 | 5031-2-1 | 5032-2-1 | 5033-2-1 | 5034-2-1 | 5035-2-1 |
| ⋮ | ⋮ | ⋮ | ⋮ | ⋮ | ⋮ |
| ENTRY M | 5031-(M+1)-1 | 5032-(M+1)-1 | 5033-(M+1)-1 | 5034-(M+1)-1 | 5035-(M+1)-1 |

I/O CONNECTION SYSTEM AND I/O CONNECTION METHOD

This application is the National Phase of PCT/JP2008/069443, filed on Oct. 27, 2008, which is based upon and claims the benefit of priority from Japanese patent application No. 2007-278395, filed on Oct. 26, 2007, the disclosure of which is incorporated herein in its entirety by reference.

TECHNICAL FIELD

The present invention relates to an I/O connection system and I/O connection method and, more particularly, to an I/O connection system and I/O connection method capable of distributing and connecting I/Os on a large scale.

BACKGROUND ART

Conventionally, an I/O connection system of this type is used to connect a plurality of computers and a plurality of I/Os in computer apparatuses or the like to make the plurality of computers share the plurality of I/Os. An example of the conventional I/O connection system is described in reference 1 (PCI-SIG, Multi-Root I/O Virtualization and Sharing Revision 0.7, Jun. 8, 2007, p. 28).

Figure 12:
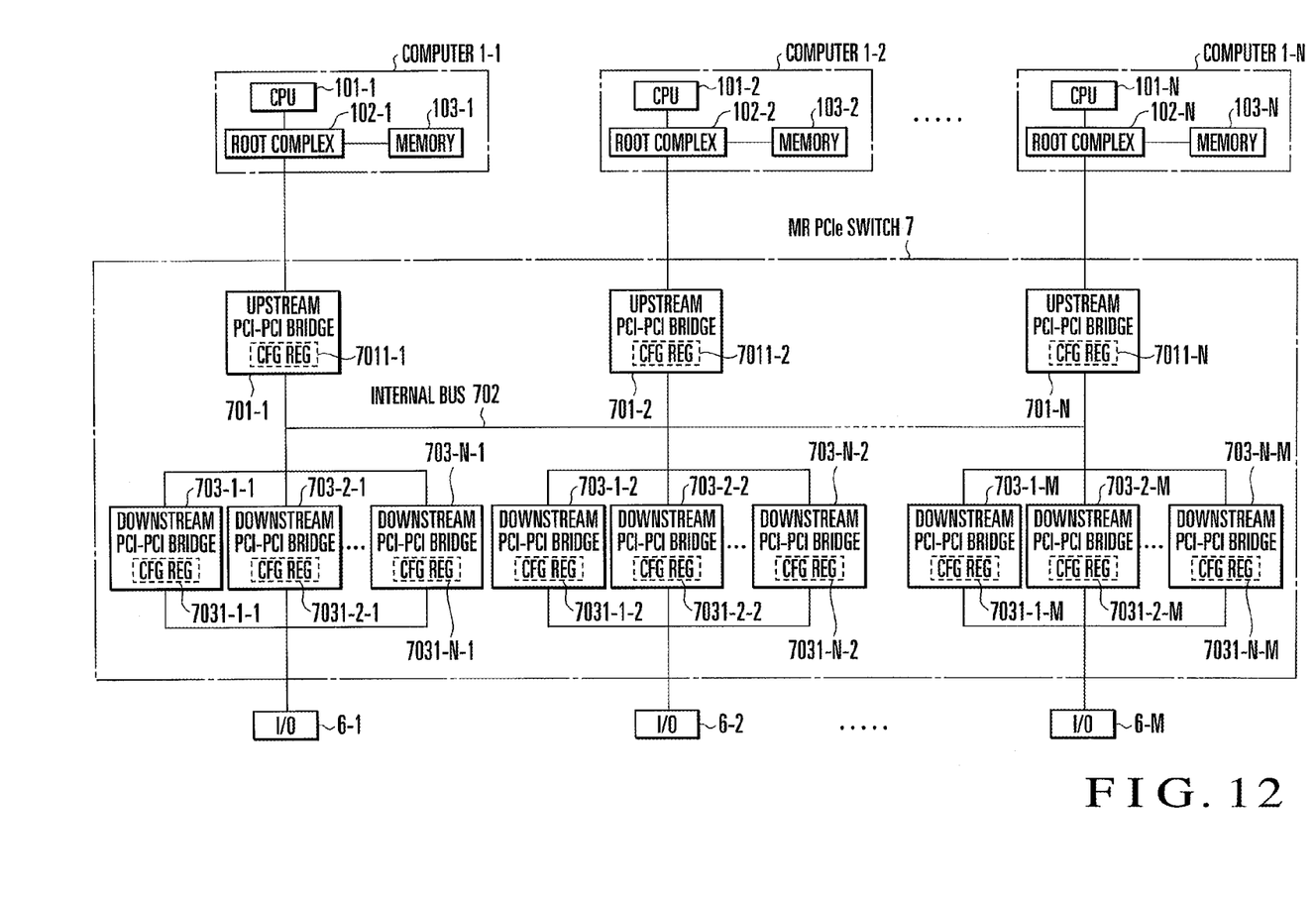
FIG. 12 is a block diagram showing the arrangement of a related art.

Referring to FIG. 12, the I/O connection system described in reference 1 complies with the standards of PCI express (PCIe), and includes a plurality of computers 1-1 to 1-N, a plurality of I/Os 6-1 to 6-M shared by the computers 1-1 to 1-N, and a multi-root PCI express switch 7 (to be referred to as an MR PCIe switch hereinafter) which connects the computers 1-1 to 1-N and the I/Os 6-1 to 6-M to each other. N and M may be different numbers.

The computers 1-1 to 1-N include CPUs 101-1 to 101-N, memories 103-1 to 103-N, and root complexes 102-1 to 102-N which connect the CPUs 101-1 to 101-N, memories 103-1 to 103-N, and MR PCIe switch 7 to each other, respectively. Traditionally, the root complexes 102-1 to 102-N are often called chip sets.

The MR PCIe switch 7 includes upstream PCI-PCI bridges 701-1 to 701-N which are PCI-PCI bridges connected to the computers 1-1 to 1-N, respectively, downstream PCI-PCI bridges 703-1-1 to 703-N-1 to 703-N-M which are PCI-PCI bridges connected to the I/Os 6-1 to 6-M, respectively, and an internal bus 702 which connects the upstream PCI-PCI bridges 701-1 to 701-N to the downstream PCI-PCI bridges 703-1-1 to 703-N-1 to 703-N-M inside the MR PCIe switch 7. In the PCIe, the side of the computers 1-1 to 1-N is called upstream, and the side of the I/Os 6-1 to 6-M is called downstream.

The upstream PCI-PCI bridges 701-1 to 701-N are assigned to the computers 1-1 to 1-N exclusively. For example, the upstream PCI-PCI bridge 701-1 is assigned to the computer 1-1. The upstream PCI-PCI bridges 701-1 to 701-N include configuration registers (CFG REGs) 7011-1 to 7011-N, respectively.

The downstream PCI-PCI bridges 703-1-1 to 703-N-1 to 703-N-M include bridges which are exclusively assigned to the computers 1-1 to 1-N in correspondence with each of the connected I/Os 6-1 to 6-M. For example, the downstream PCI-PCI bridge 703-1-1 is assigned to the computer 1-1. The TLPs (Transaction Layer Packets) of I/O transactions issued by the computers 1-1 to 1-N are transferred via the downstream PCI-PCI bridges 703-1-1 to 703-N-1 to 703-N-M assigned to the computers 1-1 to 1-N. When transferring TLPs to the I/Os 6-1 to 6-M, the downstream PCI-PCI bridges 703-1-1 to 703-N-1 to 703-N-M insert, to the TLPs, tags representing the computers 1-1 to 1-N of TLP issue sources. The downstream PCI-PCI bridges 703-1-1 to 703-N-1 to 703-N-M also erase, from TLPs received from the I/Os 6-1 to 6-M, tags representing the computers 1-1 to 1-N of the TLP issue sources, and then transfer the TLPs to the upstream PCI-PCI bridges 701-1 to 701-N. The downstream PCI-PCI bridges 703-1-1 to 703-N-1 to 703-N-M include CFG REGs 7031-1-1 to 7031-N-1 to 7031-N-M, respectively.

The CFG REGs 7011-1 to 7011-N and the CFG REGs 7031-1-1 to 7031-N-1 to 7031-N-M hold information of bus numbers and memory spaces which the computers 1-1 to 1-N allocate to the devices connected on the downstream side of the bridges. These pieces of information are used for TLP transfer. The memory spaces, bus numbers, and other information to be used to transfer TLPs will be referred to altogether as PCIe addresses hereinafter. The CFG REGs 7011-1 to 7011-N and the CFG REGs 7031-1-1 to 7031-N-1 to 7031-N-M hold codes to identify the upstream PCI-PCI bridges 701-1 to 701-N and the downstream PCI-PCI bridges 703-1-1 to 703-N-1 to 703-N-M. When these codes are read in the configuration cycles of the computers 1-1 to 1-N, the MR PCIe switch 7 is recognized and incorporated in the system.

In the MR PCIe switch 7, TLPs are transferred between the upstream PCI-PCI bridges 701-1 to 701-N and the downstream PCI-PCI bridges 703-1-1 to 703-N-1 to 703-N-M, which are assigned to the same computers 1-1 to 1-N. TLP transfer between bridges assigned to different computers 1-1 to 1-N is prohibited.

The I/Os 6-1 to 6-M are complying with the PCIe standards, and can simultaneously be shared by the plurality of computers 1-1 to 1-N. The I/Os 6-1 to 6-M hold, inside them, resources (not shown) to be individually allocated to the computers 1-1 to 1-N. These resources process I/O transactions of the computers 1-1 to 1-N. TLP transmission/reception can be done between the resources of the I/Os 6-1 to 6-M, which are allocated to the same computers 1-1 to 1-N. TLP transmission/reception is prohibited between the resources of the I/Os 6-1 to 6-M, which are allocated to different computers 1-1 to 1-N. To indicate which one of the computers 1-1 to 1-N has issued a TLP that is being processed by the resource allocated to the computer, each of the I/Os 6-1 to 6-M inserts, to the TLP, a tag to identify one of the computers 1-1 to 1-N, and transmits/receives the TLP to/from the MR PCIe switch 7.

The operation of the conventional I/O connection system will be described next.

Assume that the CPU 101-1 of the computer 1-1 has issued an I/O transaction to the I/O 6-1. The root complex 102-1 generates a TLP and transmits it to the MR PCIe switch 7. The upstream PCI-PCI bridge 701-1 receives the TLP, and confirms based on information held in the CFG REG 7011-1 whether the destination of the TLP is the device connected on the downstream side of the bridge. In this case, since the destination is the downstream device, the upstream PCI-PCI bridge 701-1 transmits the TLP to all the downstream PCI-PCI bridges 703-1-1 to 703-1-M assigned to the computer 1-1.

The downstream PCI-PCI bridges 703-1-1 to 703-1-M receive the TLP, and confirm based on information registered in the CFG REGs 7031-1-1 to 7031-1-M whether the destination of the TLP is a device connected on the downstream side of the bridge. In this case, only the downstream PCI-PCI bridge 703-1-1 has the downstream device. The downstream PCI-PCI bridge 703-1-1 adds, to the TLP, a tag to identify the computer 1-1, and transmits the TLP to the I/O 6-1. The I/O 6-1 receives the TLP, and identifies, based on the tag added to it, the computer 1-1 which has transmitted the TLP. The resource of the I/O 6-1, which is allocated to the computer 1-1, executes requested processing.

On the other hand, when transmitting a TLP from the I/O 6-1 to the computer 1-1, the procedure is reverse to that of the operation of causing the computer 1-1 to issue a TLP to the I/O 6-1. At this time, each of the upstream PCI-PCI bridge 701-1 and the downstream PCI-PCI bridge 703-1-1 receives the TLP from downstream, and transfers it to upstream if the destination of the TLP is not the device connected on the downstream side of the bridge.

DISCLOSURE OF INVENTION

Problems to be Solved by the Invention

As the first problem, it is impossible to connect a plurality of computers and a plurality of I/Os on a large scale.

The reasons are as follows. The conventional I/O connection system defines the protocol assuming that the plurality of computers and the plurality of I/Os are connected in a short range like in a single chassis, and is therefore physically restricted by the devices regarding connections. In addition, since the circuit scale of the switch that connects the plurality of computers and the plurality of I/Os increases in proportion to the number of connected devices, it is difficult to implement a large-scale switch.

As the second problem, it is impossible to distribute the plurality of computers and the plurality of I/Os to be connected.

The reasons are the same as those of the first problem.

As the third problem, to connect the plurality of computers and the plurality of I/Os on a large scale or distribute them, software and hardware complying with the standard protocol need to be modified.

The reasons are as follows. The protocol of the conventional I/O connection system is defined assuming connections in a short range. To widen the range in which connections are possible, software and hardware need to be modified based on the mechanism of their own.

An exemplary object of the invention is to provide an I/O connection system capable of connecting a plurality of computers and a plurality of I/Os on a large scale.

Another exemplary object of the invention is to provide an I/O connection system capable of distributing and connecting a plurality of computers and a plurality of I/Os.

Still another exemplary object of the invention is to provide an I/O connection system which need not modify software and hardware complying with the PCIe standards even when connecting a plurality of computers and a plurality of I/Os on a large scale or distributing them.

Means of Solution to the Problem

In an I/O connection system according to the present invention, a network and elements distributed on the network form a single multi-root PCI express switch (MR PCIe switch), thereby connecting a plurality of computers and a plurality of I/Os while allowing the plurality of computers to simultaneously share a single I/O. More specifically, an I/O connection system according to an exemplary aspect of the invention includes upstream network interface means, including a plurality of elements distributed on a network, for bridging computers and the network, and downstream network interface means, including a plurality of elements distributed on the network, for bridging I/Os and the network, wherein each of the upstream network interface means and the downstream network interface means has a function of terminating a PCI express (PCIe) bus, a function of a PCI-PCI bridge complying with PCIe standards, and a function of encapsulating a TLP into a packet and tunneling the TLP on the network, and the system incorporates the upstream network interface means as an upstream PCI-PCI bridge of an MR PCIe switch, the network as an internal bus of the MR PCIe switch, and the downstream network interface means as a set of downstream PCI-PCI bridges of the MR PCIe switch for each of the plurality of I/Os. This arrangement makes it possible to avoid timeout of the PCIe buses caused by transmitting a TLP to the network without terminating the PCIe buses. In addition, it is unnecessary to modify computer software and hardware complying with the PCIe standards. Since one MR PCIe switch is implemented by a plurality of distributed circuits, it is possible to distribute and connect a plurality of computers and a plurality of I/Os on the network on a large scale while suppressing the increase in the circuit scale even when the connection scale increases.

Effects of the Invention

As the first effect, it is possible to connect a plurality of computers and a plurality of I/Os on a large scale.

The reasons are as follows. Timeout of the PCIe buses is avoided. The connection form of the MR PCIe switch complying with the PCIe standards is maintained. The plurality of computers and the plurality of I/Os are distributed and connected using the network without physical restrictions of the devices and limitations on circuit mounting while suppressing the increase in the circuit scale of the network interfaces even when the connection scale increases.

As the second effect, it is possible to distribute and connect a plurality of computers and a plurality of I/Os.

The reasons are the same as those of the first effect.

As the third effect, when connecting a plurality of computers and a plurality of I/Os on a large scale or distributing and connecting them, software and hardware complying with the PCIe standards need not be modified.

The reasons are the same as those of the first effect.

BEST MODE FOR CARRYING OUT THE INVENTION

The best mode for carrying out the present invention will now be described in detail with reference to the accompanying drawings.

PCI express (PCIe) to be mentioned in the exemplary embodiments includes a bus standard defined by the PCIe standards and a bus standard defined by extending PCIe.

Figure 1:
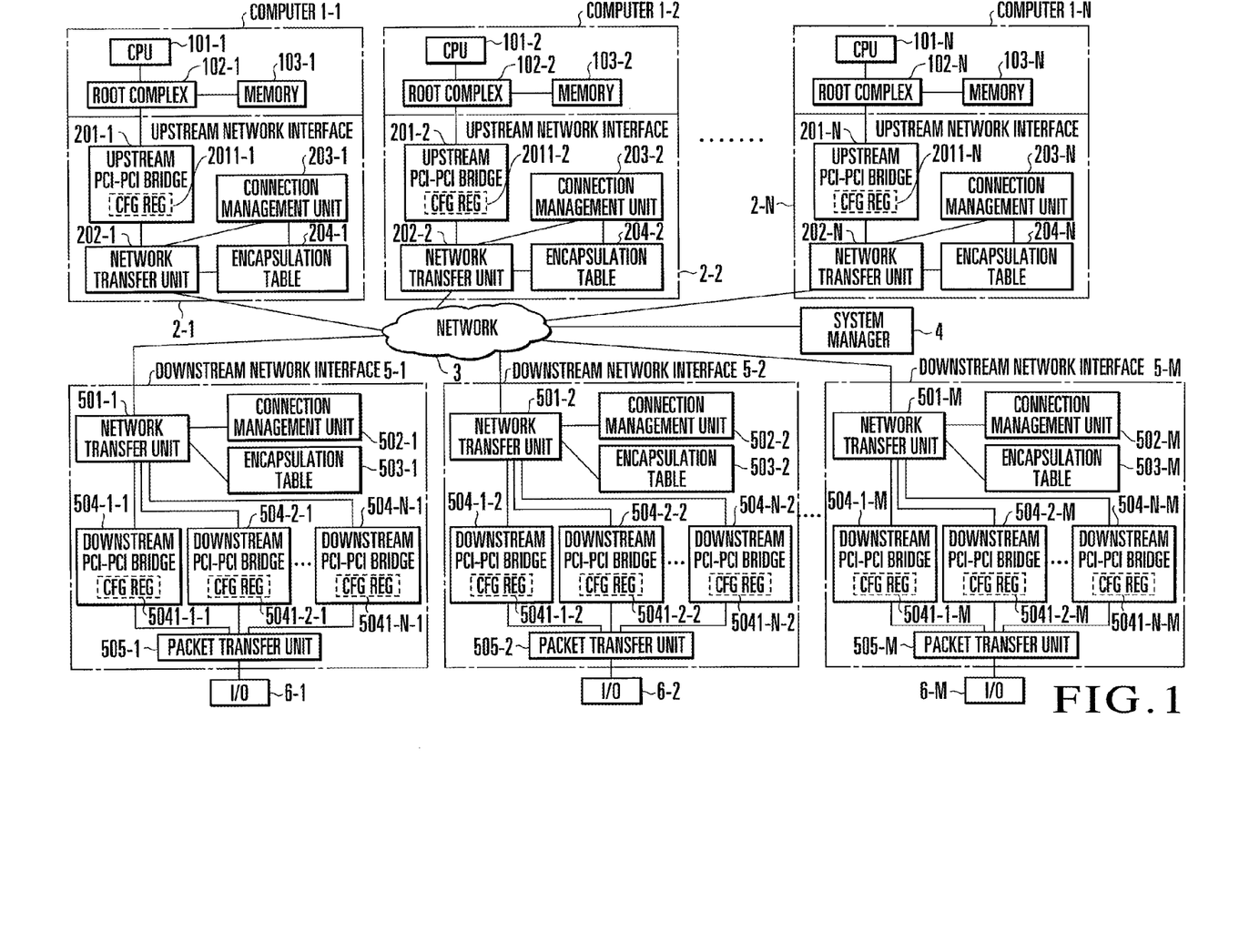
FIG. 1 is a block diagram showing an example of the arrangement of the first exemplary embodiment of the present invention.

FIG. 1 is a block diagram showing an example of the arrangement of the first exemplary embodiment for carrying out the present invention. The same reference numerals as in FIG. 12 denote the same or corresponding parts in FIG. 1.

Referring to FIG. 1, the first exemplary embodiment of the present invention includes a plurality of computers 1-1 to 1-N, a plurality of I/Os 6-1 to 6-M shared by the plurality of computers 1-1 to 1-N, a network 3 which connects the computers 1-1 to 1-N and the I/Os 6-1 to 6-M to each other, upstream network interfaces 2-1 to 2-N which bridge the computers 1-1 to 1-N and the network 3, respectively, downstream network interfaces 5-1 to 5-M which bridge the I/Os 6-1 to 6-M and the network 3, respectively, and a system manager 4 which manages connections between the computers 1-1 to 1-N and the I/Os 6-1 to 6-M. The I/Os 6-1 to 6-M include peripheral devices such as a storage device and a network interface card. The upstream network interfaces 2-1 to 2-N and the downstream network interfaces 5-1 to 5-M are elements distributed on the network 3. "Bridge" means relaying packets between different communication media, like between the PCIe and the network 3.

The upstream network interfaces 2-1 to 2-N are connected to root complexes 102-1 to 102-N via PCIe buses, respectively. The upstream network interfaces 2-1 to 2-N respectively include upstream PCI-PCI bridges 201-1 to 201-N, network transfer units 202-1 to 202-N which encapsulate and decapsulate TLPs (Transaction Layer Packets) serving as PCIe packets, connection management units 203-1 to 203-N which manage connections between the upstream network interfaces 2-1 to 2-N and the downstream network interfaces 5-1 to 5-M, and encapsulation tables 204-1 to 204-N which hold the network addresses of the downstream network interfaces 5-1 to 5-M to which the upstream network interfaces 2-1 to 2-N are connected.

The upstream PCI-PCI bridges 201-1 to 201-N relay TLPs between the root complexes 102-1 to 102-N and the network transfer units 202-1 to 202-N, respectively. The upstream PCI-PCI bridges 201-1 to 201-N include configuration registers (CFG REGs) 2011-1 to 2011-N complying with the PCIe standards, respectively. The exemplary embodiment is incorporated in the system when the upstream PCI-PCI bridges 201-1 to 201-N are recognized as PCI-PCI bridges by the computers 1-1 to 1-N in their configuration cycles together with downstream PCI-PCI bridges 504-1-1 to 504-N-M which are also recognized as PCI-PCI bridges, and one stage of multi-root PCIe switch (MR PCIe switch) complying with the PCIe standards is inserted between the computers 1-1 to 1-N and the I/Os 6-1 to 6-M.

Using, as keys, the destination PCIe addresses described in the headers of TLPs received from the upstream PCI-PCI bridges 201-1 to 201-N, the network transfer units 202-1 to 202-N detect, from the encapsulation tables 204-1 to 204-N, the network addresses of the downstream network interfaces 5-1 to 5-M to which the I/Os 6-1 to 6-M as the destinations of the TLPs are connected. The network transfer units 202-1 to 202-N encapsulate the TLPs using the obtained network addresses, describe, in the headers of the packets, the computers 1-1 to 1-N of the TLP issue sources, and transmit the TLPs to the network 3. The network transfer units 202-1 to 202-N also receive packets including encapsulated TLPs from the network 3, decapsulate the TLPs, and transmit the TLPs to the root complexes 102-1 to 102-N.

Figure 2:
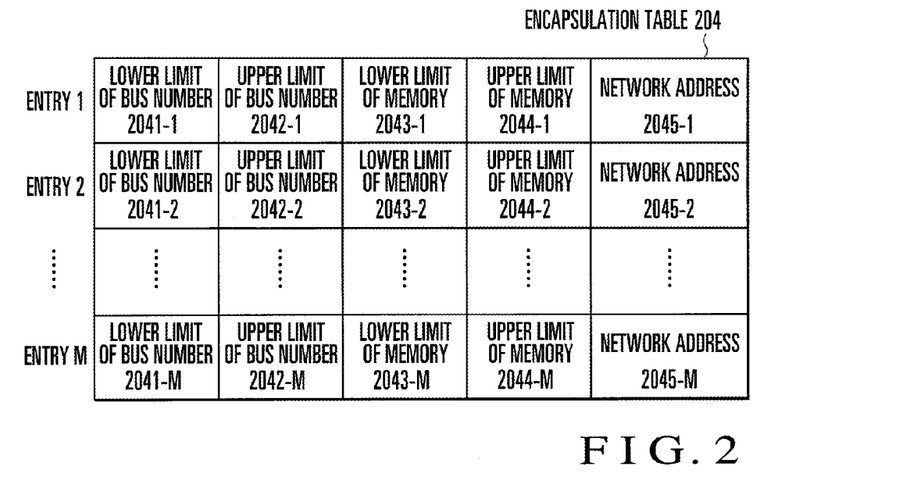
FIG. 2 is a view for explaining the first exemplary embodiment of the present invention.

The encapsulation tables 204-1 to 204-N hold the configuration information of PCIe which the computers 1-1 to 1-N connected to the upstream network interfaces 2-1 to 2-N assign to the devices on the downstream side of the downstream network interfaces 5-1 to 5-M. The encapsulation tables 204-1 to 204-N are used to detect the destination address of a packet including an encapsulated TLP. As shown in FIG. 2, each of the encapsulation tables 204-1 to 204-N includes lower limits 2041-1 to 2041-M of bus numbers, upper limits 2042-1 to 2042-M of bus numbers, lower limits 2043-1 to 2043-M of memories, upper limits 2044-1 to 2044-M of memories, and network addresses 2045-1 to 2045-M. One entry of each of the encapsulation tables 204-1 to 204-N corresponds to one of the downstream network interfaces 5-1 to 5-M. In the PCIe, the I/Os 6-1 to 6-M have, as assigned PCIe addresses, memory spaces mapped on the physical memories of the computers 1-1 to 1-N and the numbers of buses to which the I/Os 6-1 to 6-M are connected. Based on these values, the encapsulation tables 204-1 to 204-N enable to detect the network addresses 2045-1 to 2045-M of the downstream network interfaces 5-1 to 5-M to which the I/Os 6-1 to 6-M are connected.

The connection management units 203-1 to 203-N communicate with the system manager 4 using control packets, and register, in the encapsulation tables 204-1 to 204-N, the network addresses of the newly connected downstream network interfaces 5-1 to 5-M. When configuration TLPs issued by the computers 1-1 to 1-N pass through the network transfer units 202-1 to 202-N, the connection management units 203-1 to 203-N investigate PCIe addresses to be assigned to the devices on the downstream side of the upstream network interfaces 2-1 to 2-N by the computers 1-1 to 1-N, thereby registering the lower limits 2041-1 to 2041-M of bus numbers, upper limits 2042-1 to 2042-M of bus numbers, lower limits 2043-1 to 2043-M of memories, and upper limits 2044-1 to 2044-M of memories in the encapsulation tables 204-1 to 204-N.

The network 3 transmits a packet including an encapsulated TLP to its destination node.

The downstream network interfaces 5-1 to 5-M respectively include network transfer units 501-1 to 501-M which encapsulate and decapsulate TLPs, connection management units 502-1 to 502-M which manage connections between the upstream network interfaces 2-1 to 2-N and the downstream network interfaces 5-1 to 5-M or connections between the network transfer units 501-1 to 501-M, encapsulation tables 503-1 to 503-M which hold the network addresses of the downstream network interfaces 5-1 to 5-M and the upstream network interfaces 2-1 to 2-N to which the downstream network interfaces 5-1 to 5-M are connected, the downstream PCI-PCI bridges 504-1-1 to 504-N-1 to 504-N-M which are exclusively assigned to the computers 1-1 to 1-N and transfer TLPs between the network transfer units 501-1 to 501-M and packet transfer units 505-1 to 505-M, and the packet transfer units 505-1 to 505-M which insert, to the TLPs, tags representing the computers 1-1 to 1-N of the TLP issue sources.

Using, as keys, the destination PCIe addresses described in the headers of TLPs received from the downstream PCI-PCI bridges 504-1-1 to 504-N-1 to 504-N-M, the network transfer units 501-1 to 501-M detect, from the entries of the encapsulation tables 503-1 to 503-M corresponding to the downstream PCI-PCI bridges 504-1-1 to 504-N-1 to 504-N-M of the TLP transfer sources, the network addresses of the upstream network interfaces 2-1 to 2-N to which the computers 1-1 to 1-N of the destinations are connected or the downstream network interfaces 5-1 to 5-M to which the I/Os 6-1 to 6-M are connected. The network transfer units 501-1 to 501-M encapsulate the TLPs using the obtained addresses, describe, in the headers of the packets, the computers 1-1 to 1-N to which the I/Os 6-1 to 6-M of the TLP issue sources are assigned, and transmit the TLPs to the network 3. The network transfer units 501-1 to 501-M also receive packets including encapsulated TLPs from the network 3, detect, from the headers of the received packets, the computers 1-1 to 1-N which have issued the TLPs or the computers 1-1 to 1-N to which the resources of the I/Os 6-1 to 6-M which have issued the TLPs are allocated, decapsulate the TLPs, and transmit them to the downstream PCI-PCI bridges 504-1-1 to 504-N-1 to 504-N-M to which the detected computers 1-1 to 1-N are assigned.

Figure 3:
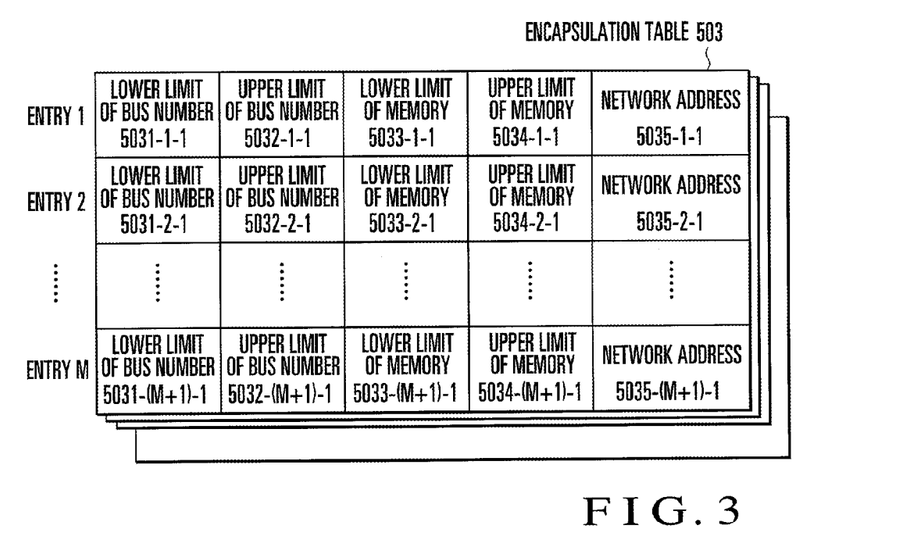
FIG. 3 is a view for explaining the first exemplary embodiment of the present invention.

As shown in FIG. 3, the encapsulation tables 503-1 to 503-M hold, in correspondence with each of the computers 1-1 to 1-N, the configuration information of PCIe addresses which the computers 1-1 to 1-N assign to the devices on the downstream side of the downstream network interfaces 5-1 to 5-M. The encapsulation tables 503-1 to 503-M are used to detect the destination address of a packet including an encapsulated TLP. FIG. 3 shows lower limits 5031-1-1 to 5031-(M+1)-1 of bus numbers, upper limits 5032-1-1 to 5032-(M+1)-1 of bus numbers, lower limits 5033-1-1 to 5033-(M+1)-1 of memories, upper limits 5034-1-1 to 5034-(M+1)-1 of memories, and network addresses 5035-1-1 to 5035-(M+1)-1, which correspond to the configuration information of the computer 1-1. Each of the encapsulation tables 503-1 to 503-M includes, in correspondence with each of the computers 1-1 to 1-N, a total of (M+1) entries, i.e., one entry to detect the network address of one of the upstream network interfaces 2-1 to 2-N to which one of the computers 1-1 to 1-N is connected and M entries to detect the network addresses of the downstream network interfaces 5-1 to 5-M to which the I/Os 6-1 to 6-M are connected. Note that the entries corresponding to the computers 1-1 to 1-N hold only the network addresses 5035-1-1 to 5035-(M+1)-1 to 5035-(M+1)-N. This is because when transferring TLPs from the downstream network interfaces 5-1 to 5-M to the upstream network interfaces 2-1 to 2-N, the destinations of the TLPs are determined to be none of the downstream network interfaces 5-1 to 5-M.

The connection management units 502-1 to 502-M communicate with the system manager 4 using control packets, and register, in the encapsulation tables 503-1 to 503-M, the network addresses of the newly connected upstream network interfaces 2-1 to 2-N and downstream network interfaces 5-1 to 5-M. When configuration TLPs issued by the computers 1-1 to 1-N pass through the network transfer units 501-1 to 501-M, the connection management units 502-1 to 502-M investigate the configuration information of PCIe addresses to be assigned to the devices on the downstream side of the downstream network interfaces 5-1 to 5-M by the computers 1-1 to 1-N, or transmit/receive the control packets to/from the connection management units 203-1 to 203-N included in the upstream network interfaces 2-1 to 2-N to investigate the PCIe addresses to be assigned to the devices on the downstream side of the remaining downstream network interfaces 5-1 to 5-M by the computers 1-1 to 1-N. The connection management units 502-1 to 502-M thus register, in the encapsulation tables 503-1 to 503-M, the lower limits 5031-1-1 to 5031-(M+1)-1 to 5031-(M+1)-N of bus numbers, upper limits 5032-1-1 to 5032-(M+1)-1 to 5032-(M+1)-N of bus numbers, lower limits 5033-1-1 to 5033-(M+1)-1 to 5033-(M+1)-N of memories, and upper limits 5034-1-1 to 5034-(M+1)-1 to 5034-(M+1)-N of memories in correspondence with each of the computers 1-1 to 1-N.

The downstream PCI-PCI bridges 504-1-1 to 504-N-M are individually assigned to the computers 1-1 to 1-N and relay TLPs between the network transfer units 501-1 to 501-M and the packet transfer units 505-1 to 505-M, respectively. For example, the downstream PCI-PCI bridges 504-1-1 to 504-N-1 are assigned to the computers 1-1 to 1-N, respectively. The downstream PCI-PCI bridges 504-1-1 to 504-N-M include CFG REGs 5041-1-1 to 5041-N-M complying with the PCIe standards, respectively. The exemplary embodiment is incorporated in the system when the downstream PCI-PCI bridges 504-1-1 to 504-N-M are recognized as PCI-PCI bridges in the configuration cycles of the computers 1-1 to 1-N together with the upstream PCI-PCI bridges 201-1 to 201-N which are also recognized as PCI-PCI bridges, and one stage of MR PCIe switch complying with the PCIe standards is inserted between the computers 1-1 to 1-N and the I/Os 6-1 to 6-M.

The packet transfer units 505-1 to 505-M receive TLPs for the I/Os 6-1 to 6-M from the downstream PCI-PCI bridges 504-1-1 to 504-N-M, add, to the TLPs, tags corresponding to the computers 1-1 to 1-N to which the downstream PCI-PCI bridges 504-1-1 to 504-N-M of the TLP transmission sources are assigned, and transfer the TLPs to the I/Os 6-1 to 6-M. The packet transfer units 505-1 to 505-M also receive, from the I/Os 6-1 to 6-M, TLPs for the computers 1-1 to 1-N or other I/Os 6-1 to 6-M, detect the computers 1-1 to 1-N represented by the tags, erase the tags from the TLPs, and transmit the TLPs to the downstream PCI-PCI bridges 504-1-1 to 504-N-M assigned to the detected computers 1-1 to 1-N. Note that the tags comply with the PCIe standards.

The I/Os 6-1 to 6-M are complying with the PCIe standards, and can simultaneously be shared by the plurality of computers 1-1 to 1-N. The I/Os 6-1 to 6-M hold, inside them, resources (not shown) to be individually allocated to the computers 1-1 to 1-N. These resources process I/O transactions of the computers 1-1 to 1-N. TLP transmission/reception is performed between the resources of the I/Os 6-1 to 6-M, which are allocated to the same computers 1-1 to 1-N. TLP transmission/reception is prohibited between the resources of the I/Os 6-1 to 6-M, which are allocated to different computers 1-1 to 1-N. To indicate which one of the computers 1-1 to 1-N has issued a TLP that is being processed by the resource allocated to the computer, each of the I/Os 6-1 to 6-M inserts, to the TLP, a tag to identify one of the computers 1-1 to 1-N, and transmits/receives the TLP to/from a corresponding one of the downstream network interfaces 5-1 to 5-M.

The system manager 4 manages connections between the computers 1-1 to 1-N and the I/Os 6-1 to 6-M and connections between the I/Os 6-1 to 6-M. The system manager 4 notifies, using control packets, the connection management units 203-1 to 203-N included in the upstream network interfaces 2-1 to 2-N connected to the computers 1-1 to 1-N and the connection management units 502-1 to 502-M included in the downstream network interfaces 5-1 to 5-M of the network addresses of the connection destinations/disconnection destinations.

The operation of the first exemplary embodiment for carrying out the present invention will be described next in detail.

An operation of causing the computers 1-1 to 1-N to issue TLPs to the I/Os 6-1 to 6-M will be explained first with reference to FIGS. 1 and 4.

When software programs running on the CPUs 101-1 to 101-N included in the computers 1-1 to 1-N issue instructions to the root complexes 102-1 to 102-N to start I/O transactions, the root complexes 102-1 to 102-N issue TLPs to the I/Os 6-1 to 6-M (step A1). The network transfer units 202-1 to 202-N receive the TLPs, and detect, from the encapsulation tables 204-1 to 204-N using the destination PCIe addresses described in the headers of the TLPs, the network addresses of the downstream network interfaces 5-1 to 5-M to which the destination I/Os 6-1 to 6-M are connected (step A2). The network transfer units 202-1 to 202-N encapsulate the TLPs using the detected network addresses (step A3), and transmit the TLPs to the network 3. The network 3 transmits the packets including the encapsulated TLPs to the destination downstream network interfaces 5-1 to 5-M (step A4). The network transfer units 501-1 to 501-M receive the packets including the encapsulated TLPs, detect the computers 1-1 to 1-N described in the headers of the packets as computers of the TLP issue sources, and decapsulate the TLPs (step A5). Subsequently, the network transfer units 501-1 to 501-M transmit the TLPs to the downstream PCI-PCI bridges 504-1-1 to 504-N-M assigned to the detected computers 1-1 to 1-N (step A6). The packet transfer units 505-1 to 505-M receive the TLPs transferred from the downstream PCI-PCI bridges 504-1-1 to 504-N-M, add, to the TLPs, tags representing the computers 1-1 to 1-N to which the downstream PCI-PCI bridges 504-1-1 to 504-N-M of the TLP transfer sources are assigned, and transmit the TLPs to the I/Os 6-1 to 6-M (step A7).

An operation of causing the I/Os 6-1 to 6-M to issue TLPs to the computers 1-1 to 1-N or the resources of other I/Os 6-1 to 6-M, which are allocated to the same computers 1-1 to 1-N, will be described next with reference to FIGS. 1 and 5.

To access the computers 1-1 to 1-N or the resources of the I/Os 6-1 to 6-M assigned to the computers 1-1 to 1-N, the I/Os 6-1 to 6-M issue TLPs added with tags representing the computers 1-1 to 1-N based on the PCIe (step B1). The packet transfer units 505-1 to 505-M receive the TLPs, detect the computers 1-1 to 1-N represented by the tags, erase the tags representing the computers 1-1 to 1-N, and transmit the TLPs to the downstream PCI-PCI bridges 504-1-1 to 504-N-M assigned to the detected computers 1-1 to 1-N (step B2). The network transfer units 501-1 to 501-M receive the TLPs transferred from the downstream PCI-PCI bridges 504-1-1 to 504-N-M, and detect, using, as keys, the destination PCIe addresses described in the headers of the TLPs, the network addresses of the destination nodes from the entries of the encapsulation tables 503-1 to 503-M corresponding to the computers 1-1 to 1-N to which the downstream PCI-PCI bridges 504-1-1 to 504-N-M of the TLP transfer sources are assigned (step B3). If the destinations of the TLPs are the computers 1-1 to 1-N, the network transfer units 501-1 to 501-M encapsulate the TLPs using the network addresses of the upstream network interfaces 2-1 to 2-N connected to the computers 1-1 to 1-N, and transmit the TLPs to the network 3 (step B4). The network 3 transmits the packets including the encapsulated TLPs to the upstream network interfaces 2-1 to 2-N (step B5). The network transfer units 202-1 to 202-N receive the packets including the encapsulated TLPs, decapsulate the TLPs, and transmit the TLPs to the computers 1-1 to 1-N (step B6). On the other hand, if the destinations of the TLPs are the resources of the I/Os 6-1 to 6-M, which are allocated to the same computers 1-1 to 1-N, the network transfer units 501-1 to 501-M encapsulate the TLPs using the network addresses of the downstream network interfaces 5-1 to 5-M connected to the destination I/Os 6-1 to 6-M, and transmit the TLPs to the network 3 (step B7). The network 3 transmits the packets including the encapsulated TLPs to the downstream network interfaces 5-1 to 5-M (step B8). The network transfer units 501-1 to 501-M receive the packets including the encapsulated TLPs, detect the computers 1-1 to 1-N described in the headers of the packets as computers to which the resources of the transmission source I/Os 6-1 to 6-M are allocated, and decapsulate the TLPs (step B9). The operations in step A6 and A7 are the same as those when the computers 1-1 to 1-N transmit TLPs to the I/Os 6-1 to 6-M, and a description thereof will not be repeated.

An operation of causing the computers 1-1 to 1-N to configure the I/Os 6-1 to 6-M will be described next with reference to FIGS. 1 and 6.

Before the software programs of the computers 1-1 to 1-N start configuration of the I/Os 6-1 to 6-M, the system manager 4 notifies, using control packets, the connection management units 203-1 to 203-N included in the upstream network interfaces 2-1 to 2-N and the connection management units 502-1 to 502-M included in the downstream network interfaces 5-1 to 5-M of the network addresses of destination nodes necessary for connections between the computers 1-1 to 1-N and the I/Os 6-1 to 6-M or connections between the I/Os 6-1 to 6-M (step C1). The connection management units 203-1 to 203-N and the connection management units 502-1 to 502-M register, in the encapsulation tables 204-1 to 204-N and the encapsulation tables 503-1 to 503-M, the connections to the network addresses received from the system manager 4 (step C2). When the configuration cycles of the computers 1-1 to 1-N start, configuration TLPs issued by the computers 1-1 to 1-N are transmitted to the I/Os 6-1 to 6-M using the connections registered in step C2 to configure the devices on the downstream side of the upstream network interfaces 2-1 to 2-N (step C3). The connection management units 203-1 to 203-N detect, from the configuration TLPs issued by the computers 1-1 to 1-N and passing through the network transfer units 202-1 to 202-N, PCIe addresses assigned to the downstream network interfaces 5-1 to 5-M, and register the PCIe addresses in the encapsulation tables 204-1 to 204-N. Similarly, the connection management units 502-1 to 502-M detect, from the configuration TLPs issued by the computers 1-1 to 1-N and passing through the network transfer units 501-1 to 501-M, PCIe addresses assigned to the devices on the downstream side of the downstream network interfaces 5-1 to 5-M, and register the PCIe addresses in the encapsulation tables 503-1 to 503-M (step C4). The connection management units 203-1 to 203-N notifies, using control packets, the connection management units 502-1 to 502-M of the PCIe addresses assigned to the devices on the downstream side of the other downstream network interfaces 5-1 to 5-M (step C5). The connection management units 502-1 to 502-M receive the sent PCIe addresses assigned to the devices on the downstream side of the other downstream network interfaces 5-1 to 5-M, and register the addresses in the encapsulation tables 503-1 to 503-M (step C6).

Note that in this exemplary embodiment, the connection management units 203-1 to 203-N included in the upstream network interfaces 2-1 to 2-N notify the connection management units 502-1 to 502-M included in the downstream network interfaces 5-1 to 5-M of the PCIe addresses assigned to the devices on the downstream side of the other downstream network interfaces 5-1 to 5-M. Alternatively, the connection management units 502-1 to 502-M included in the downstream network interfaces 5-1 to 5-M, which hold information of the same contents, may send the information to each other.

In this exemplary embodiment, instructions from the system manager 4 to the upstream network interfaces 2-1 to 2-N and the downstream network interfaces 5-1 to 5-M use the network 3. However, signal lines dedicated to control may be provided aside from the network 3.

The effects of the first exemplary embodiment for carrying out the present invention will be described next.

In the first exemplary embodiment, the upstream network interfaces and the downstream network interfaces terminate the PCIe buses. These interfaces have the PCI-PCI bridge function complying with the PCIe standards and are connected via a network to tunnel TLPs of PCIe on the network. The upstream network interfaces, the downstream network interfaces, and the network for tunneling TLPs implement one MR PCIe switch complying with the PCIe standards, and the MR PCIe switch is incorporated in the system. This makes it possible to avoid timeout of PCIe caused by transmitting a TLP to the network without terminating the PCIe buses. In addition, it is unnecessary to modify computer software and hardware such as I/Os and root complexes complying with the PCIe standards. Since one MR PCIe switch is implemented by a plurality of distributed circuits, it is possible to distribute and connect a plurality of computers and a plurality of I/Os on the network on a large scale while suppressing the increase in the circuit scale even when the connection scale increases.

Furthermore, since the downstream network interfaces 5-1 to 5-M include the downstream PCI-PCI bridges 504-1-1 to 504-N-M exclusively assigned to the computers 1-1 to 1-N, the plurality of computers can simultaneously share a single I/O.

The second exemplary embodiment for carrying out the present invention will be described next in detail with reference to the accompanying drawings.

Figure 7:
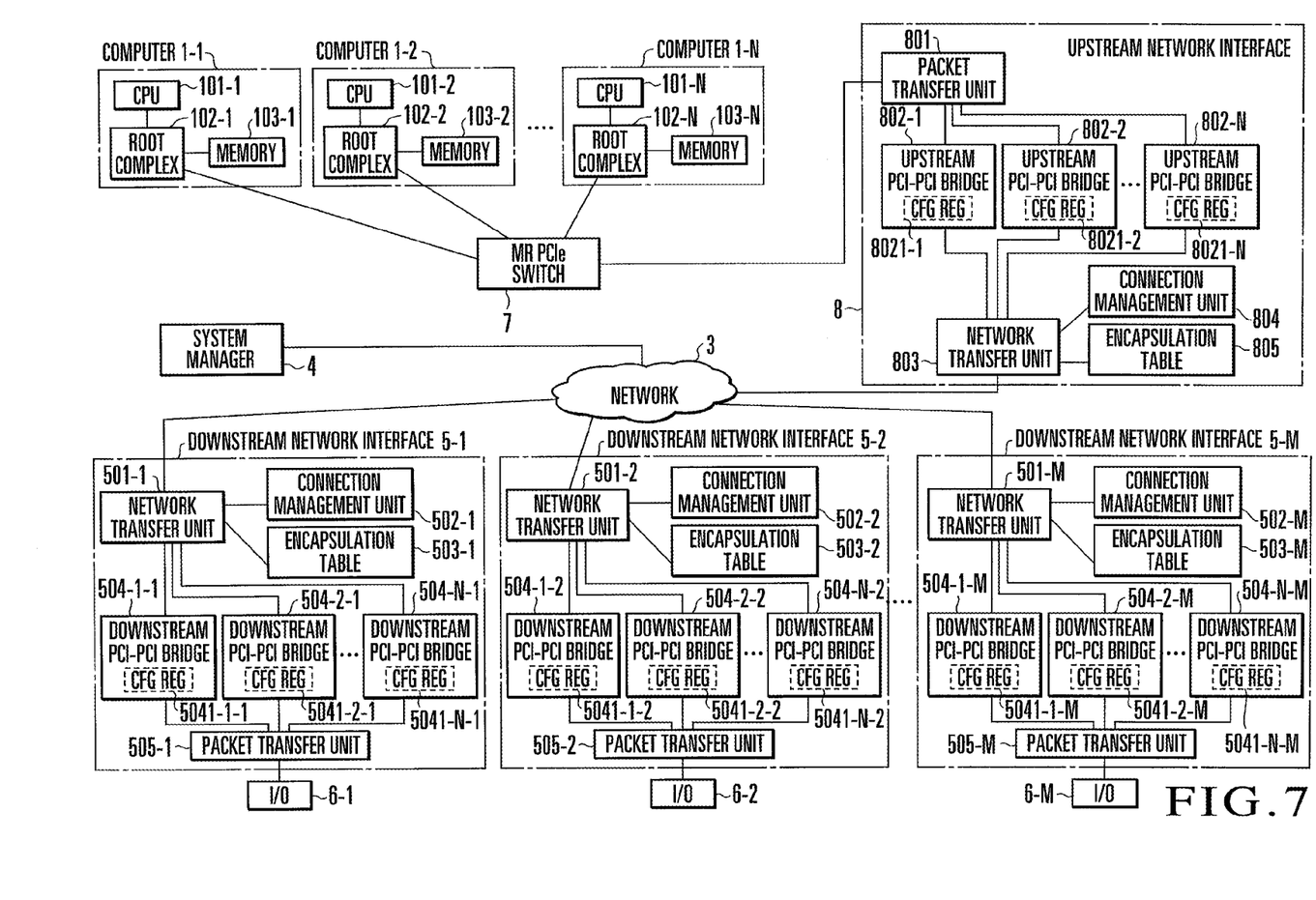
FIG. 7 is a block diagram showing an example of the arrangement of the second exemplary embodiment of the present invention.

FIG. 7 is a block diagram showing the arrangement of the second exemplary embodiment of the present invention.

Referring to FIG. 7, the second exemplary embodiment of the present invention is different from the first exemplary embodiment shown in FIG. 1 in that the arrangement includes an MR PCIe switch 7 and an upstream network interface 8 in place of the upstream network interfaces 2-1 to 2-N, the MR PCIe switch 7 is connected to a plurality of computers 1-1 to 1-N, and the upstream network interface 8 processes I/O transactions concerning the plurality of computers 1-1 to 1-N.

The MR PCIe switch 7 is connected to the plurality of computers 1-1 to 1-N to receive TLPs issued by the computers 1-1 to 1-N. The MR PCIe switch 7 adds tags representing the computers 1-1 to 1-N, and transmits the TLPs to the upstream network interface 8. The MR PCIe switch 7 also detects, from the tags of TLPs received from the upstream network interface 8, the computers 1-1 to 1-N as the destination of the TLPs, erases the tags, and transmits the TLPs to the computers 1-1 to 1-N.

The upstream network interface 8 includes a packet transfer unit 801 which adds/erases, to/from TLPs, tags representing the computers 1-1 to 1-N, upstream PCI-PCI bridges 802-1 to 802-N which are individually assigned to the computers 1-1 to 1-N to transfer TLPs, a network transfer unit 803 which encapsulates or decapsulates TLPs, a connection management unit 804 which manages connections between the upstream network interface 8 and downstream network interfaces 5-1 to 5-M, and an encapsulation table 805 which holds the network addresses of the downstream network interfaces 5-1 to 5-M to which the upstream network interface 8 is connected.

The packet transfer unit 801 receives, from the MR PCIe switch 7, TLPs added with tags representing the computers 1-1 to 1-N, detects the computers 1-1 to 1-N corresponding to the tags, erases the tags, and transfers the TLPs to the upstream PCI-PCI bridges 802-1 to 802-N assigned to the detected computers 1-1 to 1-N.

The packet transfer unit 801 also receives TLPs from the upstream PCI-PCI bridges 802-1 to 802-N, adds, to the TLPs, tags representing the computers 1-1 to 1-N to which the upstream PCI-PCI bridges 802-1 to 802-N of the TLP transfer sources are assigned, and transmits the TLPs to the MR PCIe switch 7.

The upstream PCI-PCI bridges 802-1 to 802-N are individually assigned to the computers 1-1 to 1-N, and transfer TLPs between the packet transfer unit 801 and the network transfer unit 803. The upstream PCI-PCI bridges 802-1 to 802-N include CFG REGs 8021-1 to 8021-N complying with the PCIe standards, respectively. The exemplary embodiment is incorporated in the system when the upstream PCI-PCI bridges 802-1 to 802-N are recognized as PCI-PCI bridges by the computers 1-1 to 1-N in their configuration cycles together with downstream PCI-PCI bridges 504-1-1 to 504-N-M which are also recognized as PCI-PCI bridges, and one stage of MR PCIe switch complying with the PCIe standards is inserted between the MR PCIe switch 7 and I/Os 6-1 to 6-M.

Using, as keys, the destination PCIe addresses described in the headers of TLPs received from the upstream PCI-PCI bridges 802-1 to 802-N, the network transfer unit 803 detects, from the entries of the encapsulation table 805 corresponding to the computers 1-1 to 1-N to which the upstream PCI-PCI bridges 802-1 to 802-N of the TLP transfer sources are assigned, the network addresses of the downstream network interfaces 5-1 to 5-M to which the I/Os 6-1 to 6-M as the destinations of the TLPs are connected. The network transfer unit 803 encapsulates the TLPs using the obtained network addresses, and transmits the TLPs to a network 3. The network transfer unit 803 also receives packets including encapsulated TLPs from the network 3, detects the destination computers 1-1 to 1-N from the headers of the packets, decapsulates the TLPs, and transmits the TLPs to the upstream PCI-PCI bridges 802-1 to 802-N assigned to the detected computers 1-1 to 1-N.

Figure 8:
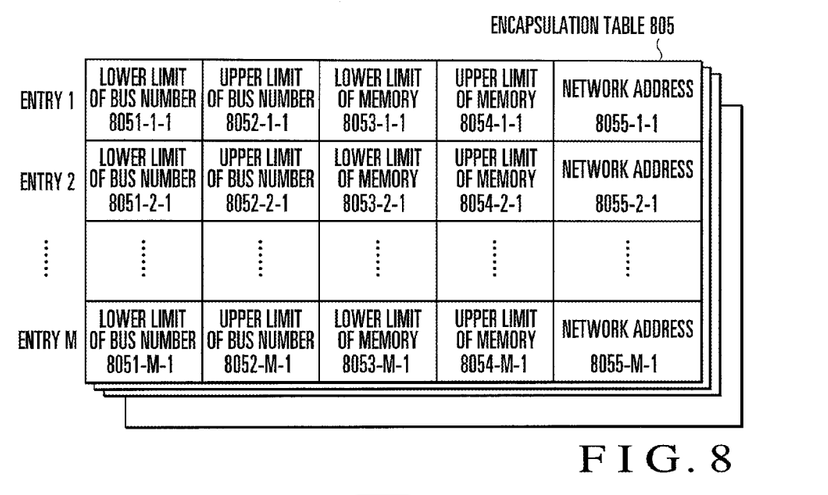
FIG. 8 is a view for explaining the second exemplary embodiment of the present invention.

As shown in FIG. 8, the encapsulation table 805 holds information of the encapsulation tables 204 in FIG. 2 only as much as the number (N) of computers 1-1 to 1-N. When the network transfer unit 803 encapsulates TLPs issued by the computers 1-1 to 1-N and transfers them to the network 3, entries corresponding to the computers 1-1 to 1-N are first detected from the encapsulation table 805. Then, the network addresses of the downstream network interfaces 5-1 to 5-M to which the destination I/Os 6-1 to 6-M are connected are detected from the entries using, as keys, the destination PCIe addresses described in the headers of the TLPs.

The operation of the second exemplary embodiment for carrying out the present invention will be described next in detail.

An operation of causing the computers 1-1 to 1-N to issue TLPs to the I/Os 6-1 to 6-M will be explained first with reference to FIGS. 7 and 9.

Figure 4:
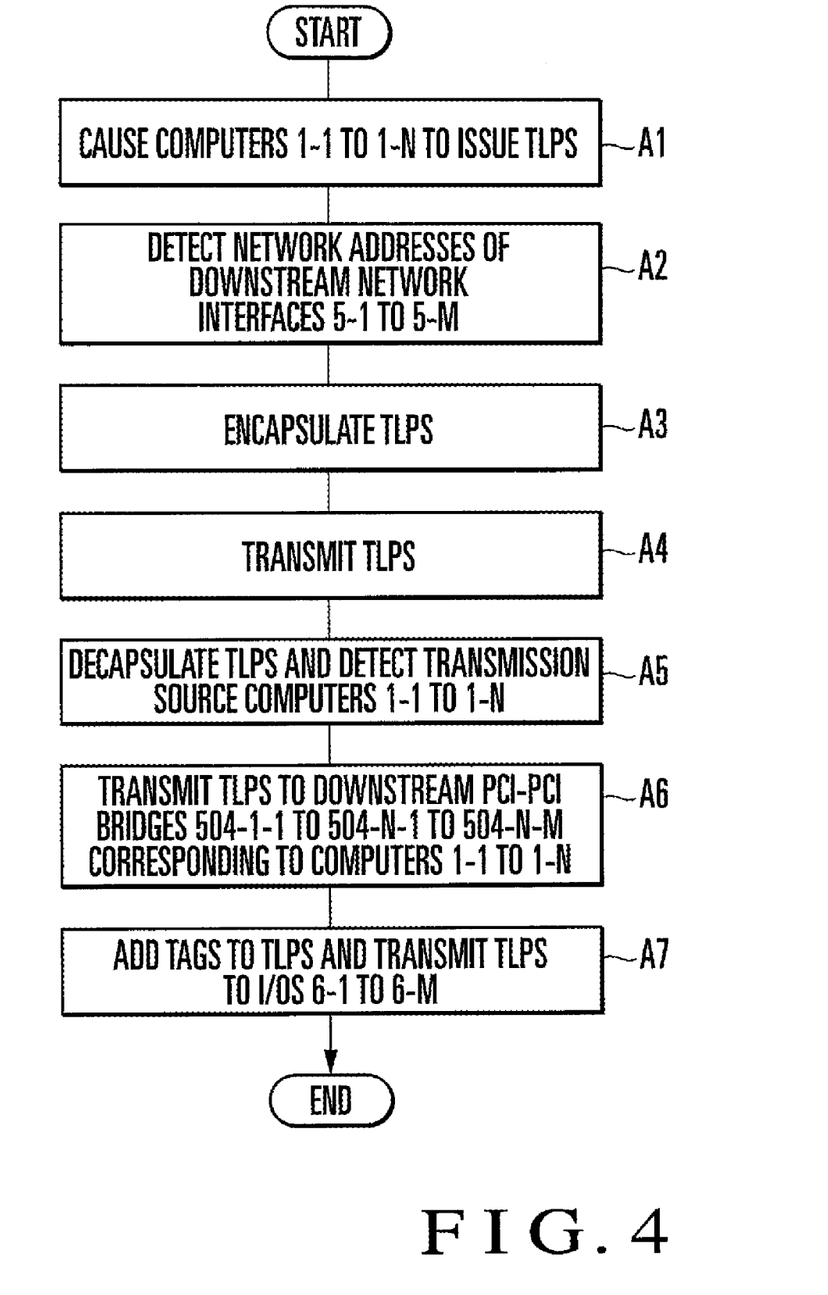
FIG. 4 is a flowchart illustrating the operation of the first exemplary embodiment of the present invention.
Figure 9:
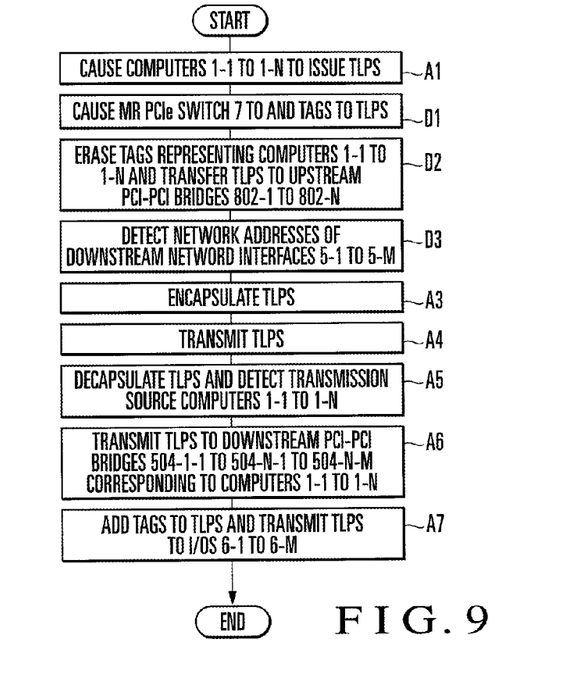
FIG. 9 is a flowchart illustrating the operation of the second exemplary embodiment of the present invention.

Referring to FIG. 9, the second exemplary embodiment for carrying out the present invention is different from the first exemplary embodiment shown in FIG. 4 in that the processing includes steps D1 to D3 in place of step A2.

The MR PCIe switch 7 receives TLPs issued by the computers 1-1 to 1-N, adds, to the TLPs, tags to identify the computers 1-1 to 1-N, and transmits the TLPs to the upstream network interface 8 (step D1). The packet transfer unit 801 detects the computers 1-1 to 1-N from the tags of the received TLPs, erases the tags, and transmits the TLPs to the upstream PCI-PCI bridges 802-1 to 802-N assigned to the detected computers 1-1 to 1-N (step D2). The network transfer unit 803 detects, from the entries of the encapsulation table 805 corresponding to the computers 1-1 to 1-N to which the upstream PCI-PCI bridges 802-1 to 802-N of the TLP transfer sources are assigned, the network addresses of the downstream network interfaces 5-1 to 5-M to which the I/Os 6-1 to 6-M as the destinations of the TLPs are connected (step D3).

The remaining steps of the operation of causing the computers 1-1 to 1-N to issue TLPs to the I/Os 6-1 to 6-M are the same as in the first exemplary embodiment, and a description thereof will not be repeated.

An operation of causing the I/Os 6-1 to 6-M to issue TLPs to the computers 1-1 to 1-N or the resources of other I/Os 6-1 to 6-M, which are allocated to the same computers 1-1 to 1-N, will be described next with reference to FIGS. 7 and 10.

Figure 5:
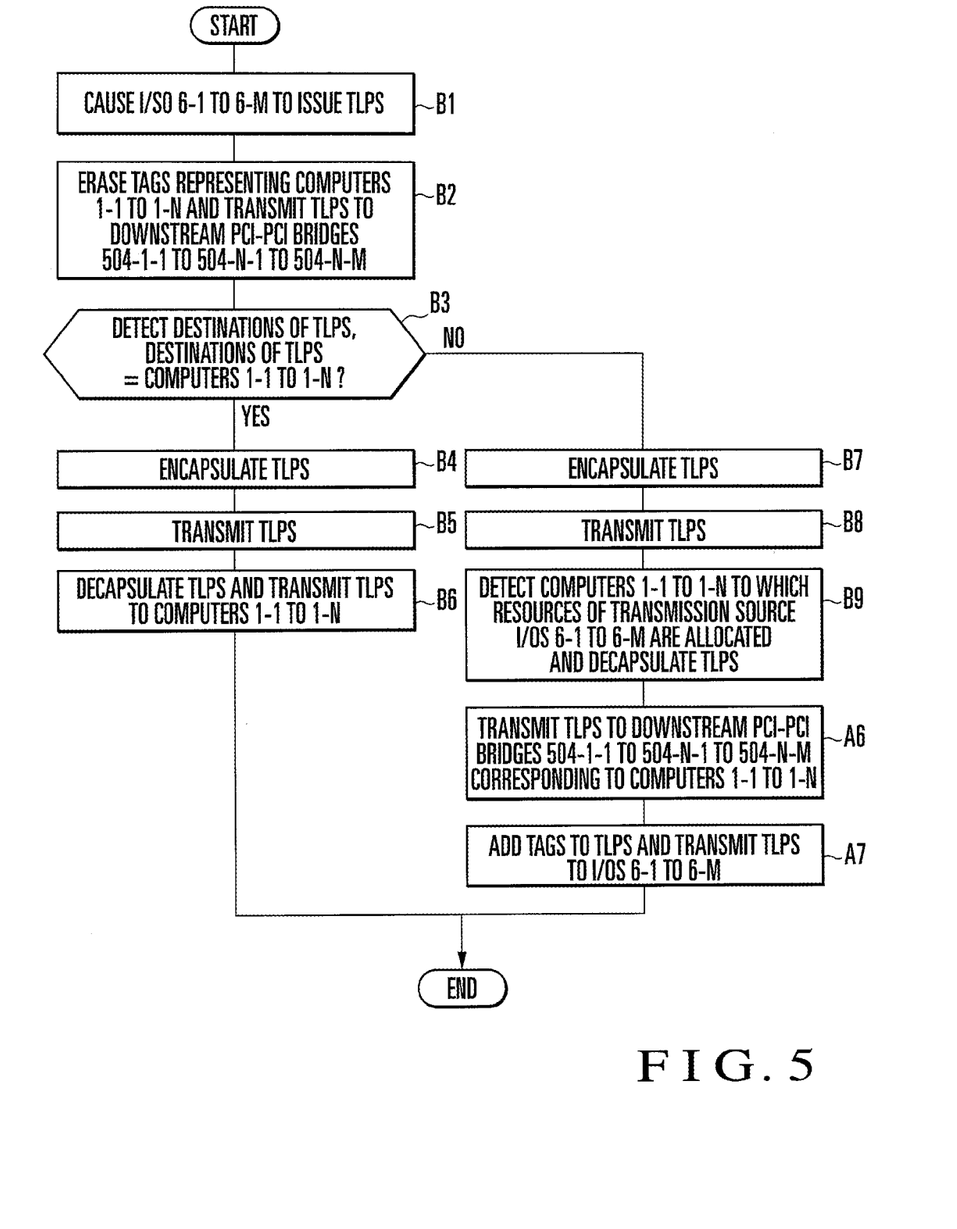
FIG. 5 is a flowchart illustrating the operation of the first exemplary embodiment of the present invention.
Figure 10:
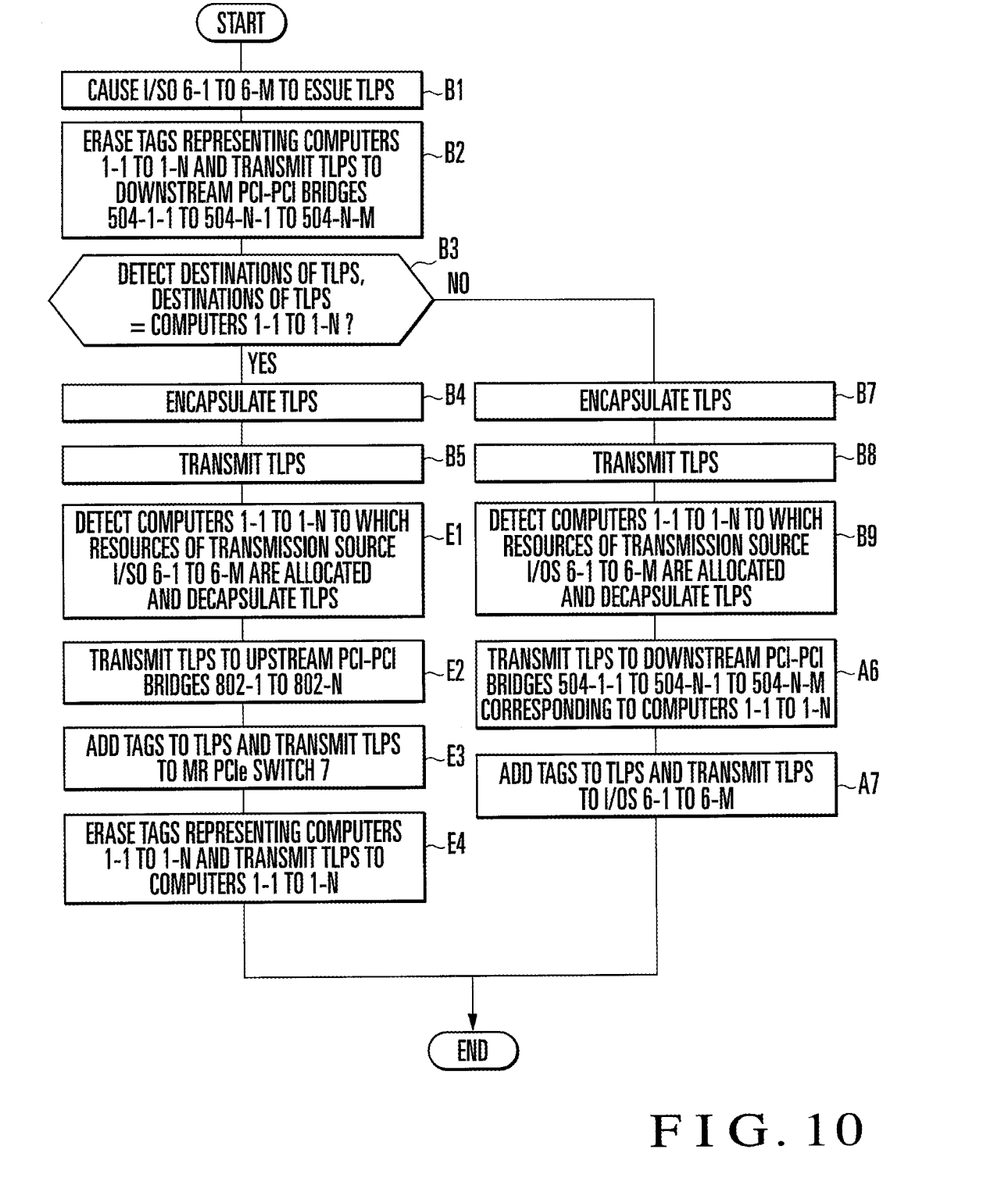
FIG. 10 is a flowchart illustrating the operation of the second exemplary embodiment of the present invention.

Referring to FIG. 10, the second exemplary embodiment of the present invention is different from the first exemplary embodiment shown in FIG. 5 in that the processing includes steps E1 to E4 in place of step B6.

The network transfer unit 803 receives packets including encapsulated TLPs from the network 3, detects the computers 1-1 to 1-N described in the headers of the packets, to which the resources of the transmission source I/Os 6-1 to 6-M are allocated, decapsulates the TLPs (step E1), and transmits the decapsulated TLPs to the upstream PCI-PCI bridges 802-1 to 802-N assigned to the detected computers 1-1 to 1-N (step E2). The packet transfer unit 801 receives TLPs from the upstream PCI-PCI bridges 802-1 to 802-N, adds, to the TLPs, tags representing the computers 1-1 to 1-N to which the upstream PCI-PCI bridges 802-1 to 802-N are assigned, and transmits the TLPs to the MR PCIe switch 7 (step E3). The MR PCIe switch 7 detects the computers 1-1 to 1-N from the tags added to the TLPs, erases the tags, and transmits the TLPs to the detected computers 1-1 to 1-N (step E4).

The remaining steps of the operation of causing the I/Os 6-1 to 6-M to issue TLPs to the computers 1-1 to 1-N or the resources of other I/Os 6-1 to 6-M, which are allocated to the same computers 1-1 to 1-N, are the same as in the first exemplary embodiment, and a description thereof will not be repeated.

An operation of causing the computers 1-1 to 1-N to configure the I/Os 6-1 to 6-M will be described next.

Figure 6:
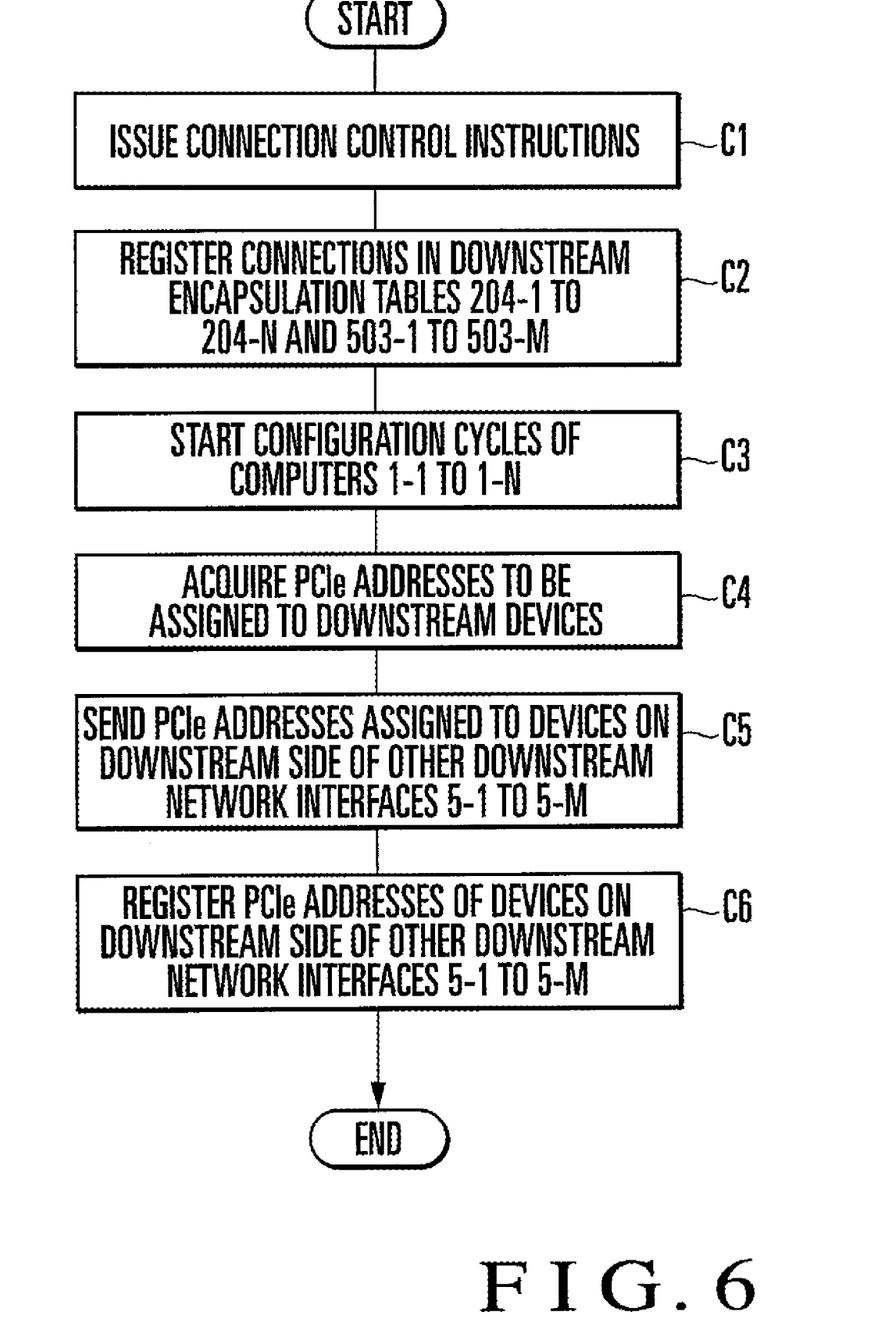
FIG. 6 is a flowchart illustrating the operation of the first exemplary embodiment of the present invention.

The operation of the second exemplary embodiment of the present invention is different from that of the first exemplary embodiment shown in FIG. 6 in that not information about one of the computers 1-1 to 1-N but pieces of information about all the N computers 1-1 to 1-N are used in encapsulation table registration (step C4) and the operation of notifying the downstream network interfaces 5-1 to 5-M of the PCIe addresses assigned to the devices on the downstream side of the other downstream network interfaces 5-1 to 5-M (step C5).

The remaining steps of the operation of causing the computers 1-1 to 1-N to configure the I/Os 6-1 to 6-M are the same as in the first exemplary embodiment, and a description thereof will not be repeated.

In this exemplary embodiment, one stage of MR PCIe switch 7 is inserted between the computers 1-1 to 1-N and the upstream network interface 8. However, the number of stages of MR PCIe switches is not limited. In addition, one or more stages of MR PCIe switches may be inserted between the downstream network interfaces 5-1 to 5-M and the I/Os 6-1 to 6-M.

The effects of the second exemplary embodiment for carrying out the present invention will be described next.

In the second exemplary embodiment, one or more computers are put together using a commercially available MR PCIe switch complying with the PCIe standards, and TLPs are transferred to a network. This enables to increase the choices of options for specifications when actually designing a computer.

The third exemplary embodiment for carrying out the present invention will be described next in detail with reference to the accompanying drawings.

Figure 11:
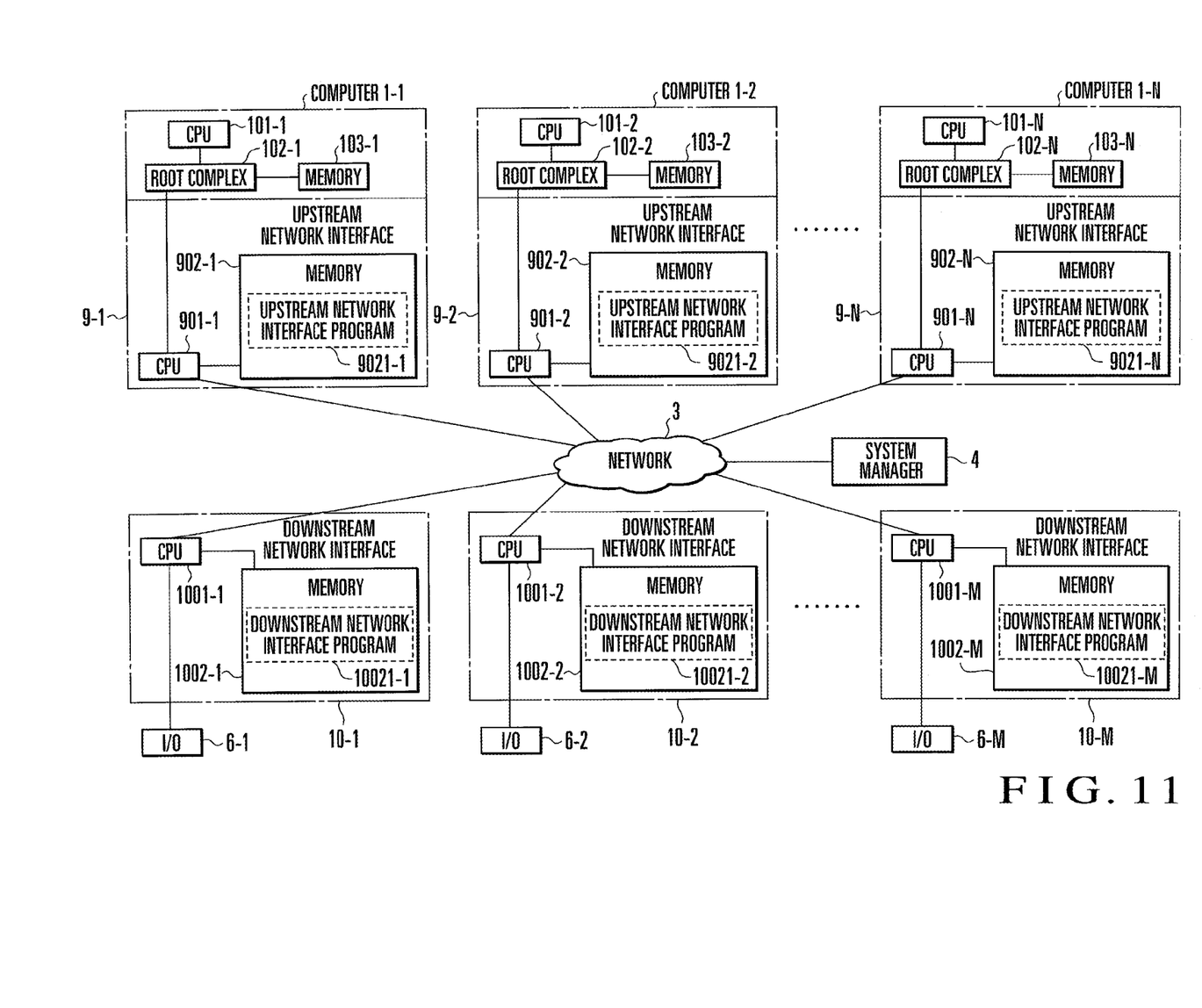
FIG. 11 is a block diagram showing an example of the arrangement of the third exemplary embodiment of the present invention.

Referring to FIG. 11, in the third exemplary embodiment, the functions of upstream network interfaces 2-1 to 2-N and downstream network interfaces 5-1 to 5-M of the first exemplary embodiment shown in FIG. 1 are implemented as firmware.

Upstream network interfaces 9-1 to 9-N include CPUs 901-1 to 901-N which process TLPs, memories 902-1 to 902-N which store programs, and upstream network interface programs 9021-1 to 9021-N which are stored in the memories 902-1 to 902-N and read out by the CPUs 901-1 to 901-N such that the CPUs 901-1 to 901-N execute the same processes as those of the upstream network interfaces 2-1 to 2-N of the first exemplary embodiment. Each of the programs 9021-1 to 9021-N can be stored in a mechanically readable storage medium such as a magnetic disk or an optical disk and provided.

Similarly, downstream network interfaces 10-1 to 10-M include CPUs 1001-1 to 1001-M which process TLPs, memories 1002-1 to 1002-M which store programs, and downstream network interface programs 10021-1 to 10021-N which are stored in the memories 1002-1 to 1002-M and read out by the CPUs 1001-1 to 1001-M such that the CPUs 1001-1 to 1001-M execute the same processes as those of the downstream network interfaces 5-1 to 5-M of the first exemplary embodiment. Each of the programs 10021-1 to 10021-N can be stored in a mechanically readable storage medium such as a magnetic disk or an optical disk and provided.

Note that in this exemplary embodiment, all the upstream network interfaces 9-1 to 9-N and downstream network interfaces 10-1 to 10-M are implemented by firmware. However, some interfaces may be implemented by firmware, and the remaining interfaces may be implemented by hardware.

In this exemplary embodiment, the functions of the first exemplary embodiment of the present invention are implemented by hardware. However, the functions of the second exemplary embodiment of the present invention may be implemented by hardware.

The present invention has been described above with reference to the exemplary embodiments. However, the present invention is not limited to the above-described exemplary embodiments. The arrangement and details of the invention can be variously modified within the scope of the invention, and these modifications will readily occur to those skilled in the art.

This application is based upon and claims the benefit of priority from Japanese patent application No. 2007-278395, filed on Oct. 26, 2007, the disclosure of which is incorporated herein in its entirety by reference.

Industrial Applicability

The present invention is applicable to an application purpose of connecting one or more computers and one or more I/Os via a network in computer apparatuses, network apparatuses, industrial devices, or consumer devices.

The invention claimed is:
1. An I/O connection system comprising:
an upstream network interface unit, including a plurality of elements distributed on a network, that bridges computers and the network; and a downstream network interface unit, including a plurality of elements distributed on the network, that bridges I/Os and the network, wherein each of said upstream network interface unit means and said downstream network interface unit means has a function of terminating a PCI express (PCIe) bus, a function of a PCI-PCI bridge complying with PCIe standards, and a function of encapsulating a TLP into a packet and tunneling the TLP on the network, and the system incorporates said upstream network interface unit as an upstream PCI-PCI bridge of a multi-root PCI express switch (MR PCIe switch), the network as an internal bus of the MR PCIe switch, and said downstream network interface unit as a set of downstream PCI-PCI bridges of the MR PCIe switch for each of the plurality of I/Os.

2. An I/O connection system according to claim 1, wherein said upstream network interface unit comprises:
an upstream PCI-PCI bridge unit complying with the PCI express (PCIe) standards;
a network transfer unit that encapsulates the TLP (Transaction Layer Packet) and transmits the TLP to the network;
a table unit that holds a network address of a connection destination to be used to encapsulate the TLP; and
a connection management unit that registers/erases the network address of the connection destination in said table unit, and
said downstream network interface unit comprises:
a network transfer unit that encapsulates a TLP and transmitting the TLP to the network;
a table unit that holds the network address of the connection destination to be used to encapsulate the TLP;
a connection management unit that registers/erases the network address of the connection destination in said table unit;
downstream PCI-PCI bridge units complying with the PCIe standards and individually assigned to the computers in association with one I/O; and
a unit that adds a tag representing the computer to the TLP and transmits the TLP to the PCIe bus.

3. An I/O connection system according to claim 1, wherein said upstream network interface unit comprises:
a unit that adds a tag representing the computer to the TLP and transmits the TLP to the PCIe bus;
an upstream PCI-PCI bridge unit complying with the PCIe standards and individually assigned to each computer;
a network transfer unit that encapsulates the TLP and transmits the TLP to the network;
a table unit that holds a network address of a connection destination to be used to encapsulate the TLP; and
a connection management unit that registers/erases the network address of the connection destination in said table unit, and
said downstream network interface unit comprises:
a network transfer unit that encapsulates a TLP and transmitting the TLP to the network;
a table unit that holds the network address of the connection destination to be used to encapsulate the TLP;
a connection management unit that registers/erases the network address of the connection destination in said table unit;
downstream PCI-PCI bridge units complying with the PCIe standards and individually assigned to the computers in association with one I/O; and
a unit that adds a tag representing the computer to the TLP and transmits the TLP to the PCIe bus.

4. An I/O connection system according to claim 2, further comprising a system manager unit that communicates with said connection management unit included in said upstream network interface unit and said connection management unit included in said downstream network interface unit, and sets connection between said upstream network interface unit and said downstream network interface unit and connection between said downstream network interface units.

5. An I/O connection system according to claim 4, wherein said upstream PCI-PCI bridge unit comprises a configuration register complying with the PCIe standards, and
said downstream PCI-PCI bridge unit comprises a configuration register complying with the PCIe standards.

6. An I/O connection system according to claim 5, wherein configuration of the I/O by the computer starts after said system manager unit has established the connection between said upstream network interface unit and said downstream network interface unit and the connection between said downstream network interface units.

7. An I/O connection system according to claim 6, wherein information of a PCIe address to be registered in said table unit included in said upstream network interface unit is acquired when a configuration TLP issued by the computer passes through said network transfer unit included in said upstream network interface unit, and
information of a PCIe address to be registered in said table unit included in said downstream network interface unit is acquired when a configuration TLP issued by the computer passes through said network transfer unit included in said downstream network interface unit.

8. An I/O connection system according to claim 7, wherein out of the information of the PCIe address to be registered in said table unit included in said downstream network interface unit, a PCIe address assigned to a device on a downstream side of a different downstream network interface unit is sent from one of said connection management unit included in said upstream network interface unit and said connection management unit included in said downstream network interface unit, and registered.

9. An I/O connection method comprising the steps of:
causing an upstream network interface unit including a plurality of elements distributed on a network to bridge computers and the network; and
causing a downstream network interface unit including a plurality of elements distributed on the network to bridge I/Os and the network,
wherein each of the upstream network interface unit and the downstream network interface unit has a function of terminating a PCI express (PCIe) bus, a function of a PCI-PCI bridge complying with PCIe standards, and a function of encapsulating a TLP into a packet and tunneling the TLP on the network, and
the system incorporates the upstream network interface unit as an upstream PCI-PCI bridge of a multi-root PCI express switch (MR PCIe switch), the network as an internal bus of the MR PCIe switch, and the downstream network interface unit as a set of downstream PCI-PCI bridges of the MR PCIe switch for each of the plurality of I/Os.

10. An I/O connection method according to claim 9, wherein
the step of causing the upstream network interface unit to bridge comprises the steps of:
performing an upstream PCI-PCI bridge function complying with the PCI express standards;
detecting a network address to which a destination I/O of the TLP received from the computer is connected; and encapsulating the TLP using the detected address and transmitting the TLP to the network, and the step of causing the downstream network interface unit to bridge comprises the steps of:

individually performing a downstream PCI-PCI bridge function for the computers in association with one I/O, receiving the packet including the encapsulated TLP from the network; and decapsulating the TLP, adding a tag representing the computer to the TLP, and transmitting the TLP to the destination I/O of the TLP.

11. An I/O connection method according to claim 10, wherein the step of causing the downstream network interface unit to bridge further comprises the steps of:

erasing, from the TLP received from the I/O, the tag representing the computer;

detecting a network address to which one of a destination computer and a destination I/O of the TLP is connected; and encapsulating the TLP using the detected address and transmitting the TLP to the network, and the step of causing the upstream network interface unit to bridge further comprises the steps of:

receiving the packet including the. encapsulated TLP from the network; and decapsulating the TLP and transmitting the TLP to the computer.

12. An I/O connection method according to claim 9, wherein the step of causing the upstream network interface unit to bridge comprises the steps of:

individually performing an upstream PCI-PCI bridge function complying with the PCI express standards for each computer;

erasing, from the TLP received from the computer, a tag representing the computer;

detecting a network address to which a destination I/O of the TLP is connected; and encapsulating the TLP using the detected address and transmitting the TLP to the network, and the step of causing the downstream network interface unit to bridge comprises the steps of:

individually performing a downstream PCI-PCI bridge function complying with the PCIe standards for the computers in association with one I/O;

receiving the packet including the encapsulated TLP from the network; and decapsulating the TLP, adding a tag representing the computer to the TLP, and transmitting the TLP to the destination I/O of the TLP.

13. An I/O connection method according to claim 12, wherein the step of causing the downstream network interface unit to bridge comprises the steps of:

erasing, from the TLP received from the I/O, the tag representing the computer;

detecting a network address to which one of a destination computer and a destination I/O of the TLP is connected; and encapsulating the TLP using the detected address and transmitting the TLP to the network, and the step of causing the upstream network interface unit to bridge comprises the steps of:

receiving the packet including the encapsulated TLP from the network; and decapsulating the TLP, adding a tag representing the computer, and transmitting the TLP to the computer.

14. An I/O connection method according to claim 12, further comprising the step of changing, using one of a control packet and a control signal, one of connection between the upstream network interface unit and the downstream network interface unit and connection between the downstream network interface units.

15. An I/O connection method according to claim 14, wherein the step of performing the upstream PCI-PCI bridge function comprises the step of causing the computer to perform configuration access to a configuration register complying with the PCIe standards, and the step of performing the downstream PCI-PCI bridge function comprises the step of causing the computer to perform configuration access to a configuration register complying with the PCIe standards.

16. An I/O connection method according to claim 15, further comprising the step of starting configuration of the I/O by the computer after the connection between the upstream network interface unit and the downstream network interface unit and the connection between the downstream network interface units have been established.

17. An I/O connection method according to claim 16, wherein the step of causing the upstream network interface unit to detect comprises the step of detecting the network address using information of a PCIe address acquired when a configuration TLP issued by the computer passes through the upstream network interface unit, and the step of causing the downstream network interface unit to detect comprises the step of detecting the network address using information of a PCIe address acquired when a configuration TLP issued by the computer passes through the downstream network interface unit.

18. An I/O connection method according to claim 17, wherein the step of causing the downstream network interface unit to detect further comprises the step of, when a destination of the TLP is another I/O, detecting the network address using a PCIe address sent from one of the upstream network interface unit and the downstream network interface unit.

19. A computer-readable storage medium storing an I/O connection program for causing a computer, which forms an upstream network interface unit, including a plurality of elements distributed on a network, that bridges computers and the network, the upstream network interface unit having a function of terminating a PCI express (PCIe) bus, a function of a PCI-PCI bridge complying with PCIe standards, and a function of encapsulating a TLP into a packet and tunneling the TLP on the network, and being incorporated as an upstream PCI-PCI bridge of a multi-root PCI express switch, to function as:

an upstream PCI-PCI bridge unit complying with the PCI express standards;

a network transfer unit that encapsulates the TLP (Transaction Layer Packet) and transmits the TLP to the network;

a table unit that holds a network address of a connection destination to be used to encapsulate the TLP; and a connection management unit that registers/erases the network address of the connection destination in the table unit.

* * * * *